Dec. 11, 1923.
W. C. ENGEL
1,477,433
AUTOMOBILE SPRING REGULATOR
Filed Dec. 20, 1921
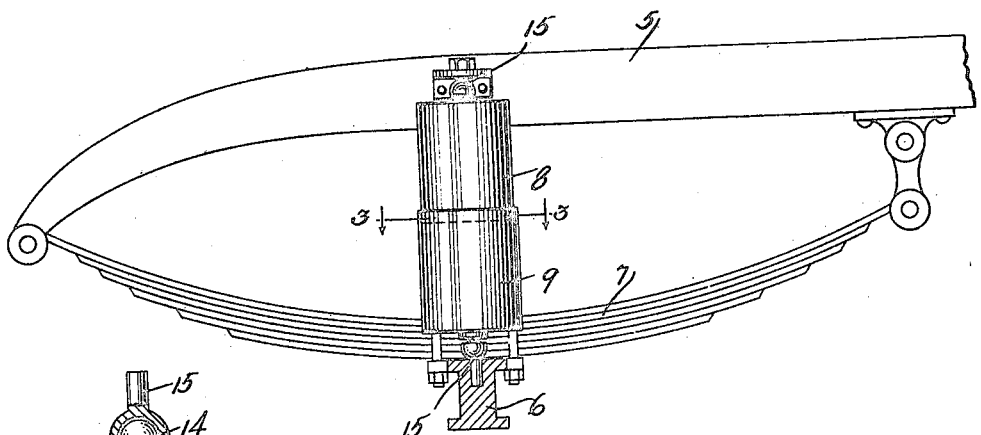
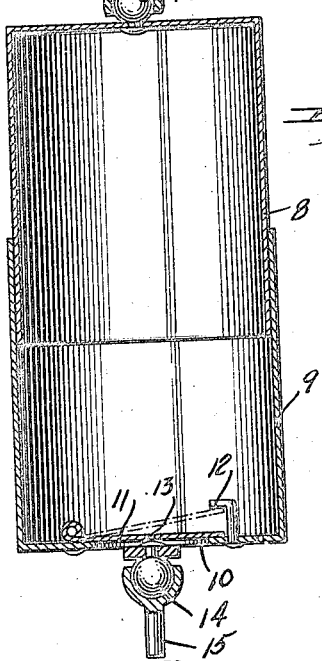
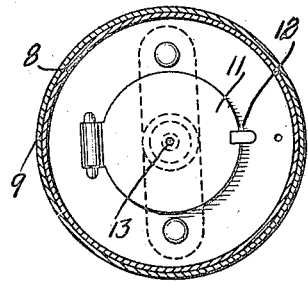
INVENTOR
W. C. Engel
BY
ATTORNEYS
WITNESSES Patented Dec. 11, 1923.

1,477,433

UNITED STATES PATENT OFFICE.

WILLIAM C. ENGEL, OF ASHLAND, PENNSYLVANIA.

AUTOMOBILE SPRING REGULATOR.

Application filed December 20, 1921. Serial No. 523,687.

*To all whom it may concern:*

Be it known that I, WILLIAM C. ENGEL, a citizen of the United States, and resident of Ashland, in the county of Schuylkill and State of Pennsylvania, have invented a new and Improved Automobile Spring Regulator, of which the following is a full, clear, and exact description.

My invention relates to a spring regulator, and more particularly aims to provide a device of this nature adapted for use in connection with the spring suspension of automobiles.

In connection with motor vehicles, and more particularly their spring suspension, it is a well appreciated fact that considerable difficulty has been experienced incident to the fact that the springs, although reacting to the movement of the axles and the chassis, have responded to this reaction in too violent a manner.

With this in mind numerous devices have been placed upon the market with a view of overcoming this difficulty, but for the most part these members have been relatively complicated and accordingly expensive in manufacture.

Thus my present invention aims to provide a spring regulator particularly adapted for use in connection with the suspension of automobiles, and by means of which the action of the springs will be cushioned, or regulated to such an extent as to overcome the difficulties aforementioned in this connection.

Still another object of this invention is the construction of a device of the character stated which shall embody extremely simple mechanism, and shall thus be capable of being manufactured at a nominal figure.

Still further objects of this invention will become apparent in the annexed specification taken in connection with the drawings, which latter illustrate one practical embodiment thereof, and in which:

Figure 1 is a side elevation of my regulating device, and showing the same associated with the conventional chassis and axle of a vehicle.

Figure 2 is an enlarged sectional side view of the same, and

Figure 3 is a transverse sectional view taken along the line 3—3 and in the direction of the arrows indicated in Figure 1.

Referring now more particularly to Figure 1 it will be seen that the reference numeral 5 indicates a frame supported upon an axle 6 by means of any suitable type of spring 7, the foregoing being all conventional construction, and forming no part of my invention.

It will also be seen in the embodiment illustrated, that I have shown my improved type of spring regulator as interposed between the axle 6 and the frame 5.

Referring now more particularly to the detailed construction of this regulator, it will be seen that the same includes a pair of sections 8 and 9 which are preferably cylindrical, and of such a size that they may be telescopically disposed with respect to each other. Also in the embodiment illustrated the section 9 is shown with an opening 10, and this opening constitutes a valve port the flow of fluid through the same being controlled by any suitable type of valve, such as a flap 11, the movement of which may be limited by a member 12.

Now assuming that the sections 8 and 9 are associated with the frame and axle respectively, it will be understood that when the axle moves away from the frame that the valve 11 will move to the position indicated in dotted lines in Figure 2, thus permitting air to flow freely into the interior of the sections. However, upon the axle rebounding towards the frame 5, the air will be compressed within the sections 8 and 9, and thus the entire device will serve to regulate this rebounding action, it being noted, however, that an opening 13 is preferably provided in the body of the valve, which opening serves to permit of a slow escape of this compressed air, to thus allow the axle to gradually assume its normal position.

Now with a view of properly retaining the regulator in this position, it will be noted that I preferably associate spherical elements 14, one with each of the sections 8 and 9, and these spherical elements are adapted to co-operate with socket members 15 affixed to the frame and axle respectively, thus providing ball and socket joints at these points. Obviously by this construction, the normal movement of the axle with respect to the frame is not interfered with in the slightest in view of the fact that this mounting is what might be termed "universal". However, it will be obvious that my regulator will at all times serve to accomplish the result for which it is intended, it being understood that the same is capable of being placed in any desired position, and that the structure of this element may be varied in many particulars.

It will further be understood that numerous modifications of structure might readily be resorted to without in the least departing from the scope of my claims, which are—

1. The combination with the chassis, axle and spring of a vehicle, of two cylinders, each having an open end and telescoping one in the other, one of the cylinders having an opening in its closed end, a flap valve on the inner face of the end of the cylinder and closing said opening, the valve being provided with a small opening and means for securing one cylinder to the chassis and the other to the axle.

2. A regulator for springs, consisting of two cylinders, each having an open end and telescoping one in the other, one cylinder having an opening in its end wall and a flap valve on the inner face of the end of one cylinder and closing said opening, the valve being provided with a small opening.

WILLIAM C. ENGEL.